United States Patent [19]

Hobson

[11] 4,279,403

[45] Jul. 21, 1981

[54] NON-REVERSIBLE VALVE ASSEMBLY

[75] Inventor: Michael J. Hobson, Fullerton, Calif.

[73] Assignee: The United States of America as represented by the Secretary of the Navy, Washington, D.C.

[21] Appl. No.: 13,100

[22] Filed: Feb. 21, 1979

[51] Int. Cl.³ .............................................. F16K 15/03
[52] U.S. Cl. .................................... 251/148; 137/527
[58] Field of Search ...................... 137/515.7, 315, 527, 137/527.2, 527.4, 527.6, 527.8; 251/148, 305, 306, 307

[56] References Cited

U.S. PATENT DOCUMENTS

| 2,385,510 | 9/1945 | Harwood | 251/306 |
| 2,729,237 | 1/1956 | Hite | 137/515.7 |
| 2,729,238 | 1/1956 | Hite | 137/515.7 |
| 3,374,804 | 3/1968 | Stegerud | 137/515.7 X |
| 3,409,268 | 11/1968 | Gachot | 251/148 |
| 3,613,720 | 10/1971 | Welch | 137/527 X |
| 4,143,853 | 3/1979 | Abramson | 137/515.7 X |
| 4,148,338 | 4/1979 | Skoli | 137/515.7 |

FOREIGN PATENT DOCUMENTS 12241 of 1905 United Kingdom ..................... 251/305

Primary Examiner—William R. Cline
Attorney, Agent, or Firm—Richard S. Sciascia; Thomas M. Phillips

[57] ABSTRACT

A pipe-coupling assembly includes a radially-extending ring-shaped member carrying a flow-controlling valve plate. Ring-supporting members press flushly against both sides to operatively mount the ring member and its valve plate in the conduit. Non-reversibility is achieved by forming a lateral flange on one side only of the ring member and a mating groove in one only of its support members. Correct mounting requires the mating of the flange and groove.

4 Claims, 1 Drawing Figure

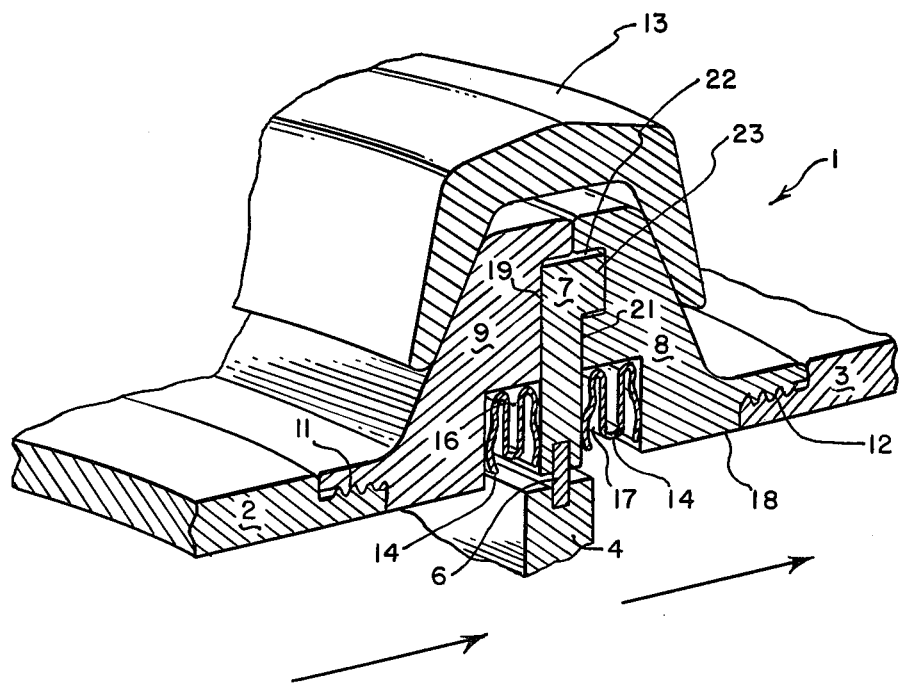

NON-REVERSIBLE VALVE ASSEMBLY

BACKGROUND OF THE INVENTION

The invention relates generally to valve assemblies and, in particular, to non-reversible valve mountings.

Many valves of all types are designed to be installed in a particular manner relative to the flow direction in the conduit in which they are mounted. All too frequently, however, the valves accidently are installed improperly and, consequently, may become inoperative. One answer to this problem is to provide assemblies which fit together in a non-reversible manner and, as is recognized, many structures, including valves, incorporate such a non-reversibility. Even so, there frequently are problems in applying the concept to particular assemblies. In other words, the problem is not so much one of simply providing the desired non-reversibility, but, instead, one of applying non-reversibility to a particular valve assembly in a manner which retains its simplicity, low cost, and performance characteristics which initially prompted the use of that particular assembly. In particular, the arrangement that provides the non-reversibility should be one that does not increase costs or complicate installation, maintenance and repair procedures.

The present invention, as will become apparent, involves primarily a situation of just such a nature, i.e., it is concerned with providing a non-reversible capability for a particular valve assembly which has been selected for particular uses. This assembly subsequently will be described. For the present, it can be noted that it is functionally somewhat similar to an assembly described in detail in U.S. Pat. No. 3,374,804 in that it is butterfly-type check valve having hinged flaps which are swung open by flow in one direction and closed by flow in the other. However, although such a check valve has been the primary concern, the present invention obviously is applicable to other valves even though the flow control function is not that of a check valve.

BRIEF DESCRIPTION OF THE DRAWING

The invention is illustrated in the accompanying drawing which is a perspective view of a portion of the assembly.

DETAILED DESCRIPTION OF THE INVENTION

In the drawing, the present valve assembly, designated assembly 1, operatively couples the spaced ends of a pair of conduit forming pipe or duct sections 2 and 3 and, for descriptive purposes, it can be considered that the desired direction of flow through the valve is as shown by the arrows. Since the conduits usually are round or cylindrical, the assembly members or components used to couple the pipes and support the valve also are cylindrical. The drawing shows only a portion of the intended circumferential extents.

Insofar as the present invention is concerned, flow control through the valve can be provided in a number of different manners. As shown, the assembly includes a flow controlling valve member in the form of a butterfly check valve 4 pivoting on pin 6 at its diametrically-opposite ends. The intended check valve is similar to the previously-mentioned flap type butterfly of U.S. Pat. No. 3,374,804 in which hinged flaps are carried on a shaft extending diametrically across the conduit. In this configuration, the illustrated portion of flow control valve 4 can be viewed as the shaft itself. The flaps, in turn, are carried by this shaft. Other types of pivotal discs or plates are contemplated as are other types of flow control, i.e., other than check valve control.

The particular valve assembly to which the present non-reversible features are applied includes a ring-shaped member 7 which securely carries valve-supporting pins 6 and which, as already noted, is circumferential in shape extending completely around the peripheral extent of the conduit. A pair of clamp members 8 and 9 firmly engage ring member 7 and, as shown, the clamp members have threaded outer ends 11 and 12 engaging and coupling threaded extents of the pipe sections. A circular, U-shaped clamp 13 fits over the clamping members to exert the pressure needed to firmly support ring 7 in its engagement with members 8 and 9. Annular bellows-type seals 14 are provided on each side of ring member 7, the seals being retained in annular spaces 16 and 17 provided on interior walls 18 of the clamp members. When the clamp members are coupled to the pipe sections, these inner walls flushly extend the inner bore of the pipes and provide a continuation of the flow conduit.

Ring member 7, as shown, is formed with radially-extending side walls 19 and 21 projecting outwardly of the conduit and, when clamped, these side walls flushly engage inner walls of the clamp members. Outer walls of the clamp members are tapered to receive the U-clamp.

The particular feature of the invention lies in the manner in which an assembly of this type is made non-reversible, or, in other words, is formed to assure installation of its valve in the proper manner relative to the flow. To achieve this end, inner wall 21 of clamp member 8 is provided a groove 22 and side wall 21 of the ring member with a flange 23 contoured to mate with the groove when the members are clamped together. As will be apparent, the mounting of valve 4 in the conduit requires the mating of the flange and groove and a firmly-clamped support of the valve can be achieved only when these parts are so mated. Obviously, this arrangement requires both the groove and the flange to be formed on one side only of their walls. The other sides are flat-surfaced to provide their flush interengagement.

It is recognized that the flange and groove interengagement is an unusually simple way of achieving the non-reversible mounting. However, it is this very simplicity which renders this arrangement attractive. In particular, it is a relatively simple and inexpensive operation to form both the groove and the flange. Of equal interest, these mated members easily can be formed in many valves which already are in use and which have proven troublesome because of the potential for accidental installation reversals. As has been noted, the problem is not so much in the provision of non-reversibility as it is in providing this characteristic in a simple and effective manner. The present arrangement provides the desired result without complications and with little increase in fabrication costs.

Obviously many modifications and variations of the present invention are possible in the light of the above teachings. It is therefore to be understood that within the scope of the appended claims the invention may be practiced otherwise than as specifically described.

I claim:

1. A non-reversible valve assembly for supporting a flow-control valve member in its correct operative disposition in a conduit formed between a pair of pipes comprising:

a support member secured to said flow control member for carrying it in said operative disposition, said support member being formed with side wall portions extending radially outwardly of said conduit, a flange formed on and projecting laterally of one of said side wall portions, a pair of pipe-supported clamping members having radially-extending interior side wall portions flushly engaging opposite surfaces of said support member side walls with the interior wall portion of one of the clamping members being formed with an indented groove for closely receiving the lateral flange of said support member only when said flow control member is in the correct operative orientation, thereby rendering the valve assembly to be non-reversible, and means for exerting a firm clamping pressure on said clamping members.

2. The assembly of claim 1 wherein said support and clamping members both are ring shaped members and said flange also is in the form of a ring projecting laterally outwardly from said one side wall portion of said support member.

3. The assembly of claim 2 wherein said pair of clamping members each are provided with threaded end portions adapted to be coupled to said pipes to form said conduit when said members tightly clamp said ring-shaped support member, said clamping members then having inner wall bore-portions co-extensive with the inner walls of the pipes for forming the conduit.

4. The assembly of claim 3 further including ring-shaped sealing means engaging both the inner wall portions of the clamping members and the side wall portions of said support member for containing said flow.

* * * * *